Oct. 12, 1948.   O. BIEBER   2,451,316
APPARATUS FOR DESICCATION
Filed Oct. 19, 1942   2 Sheets-Sheet 2
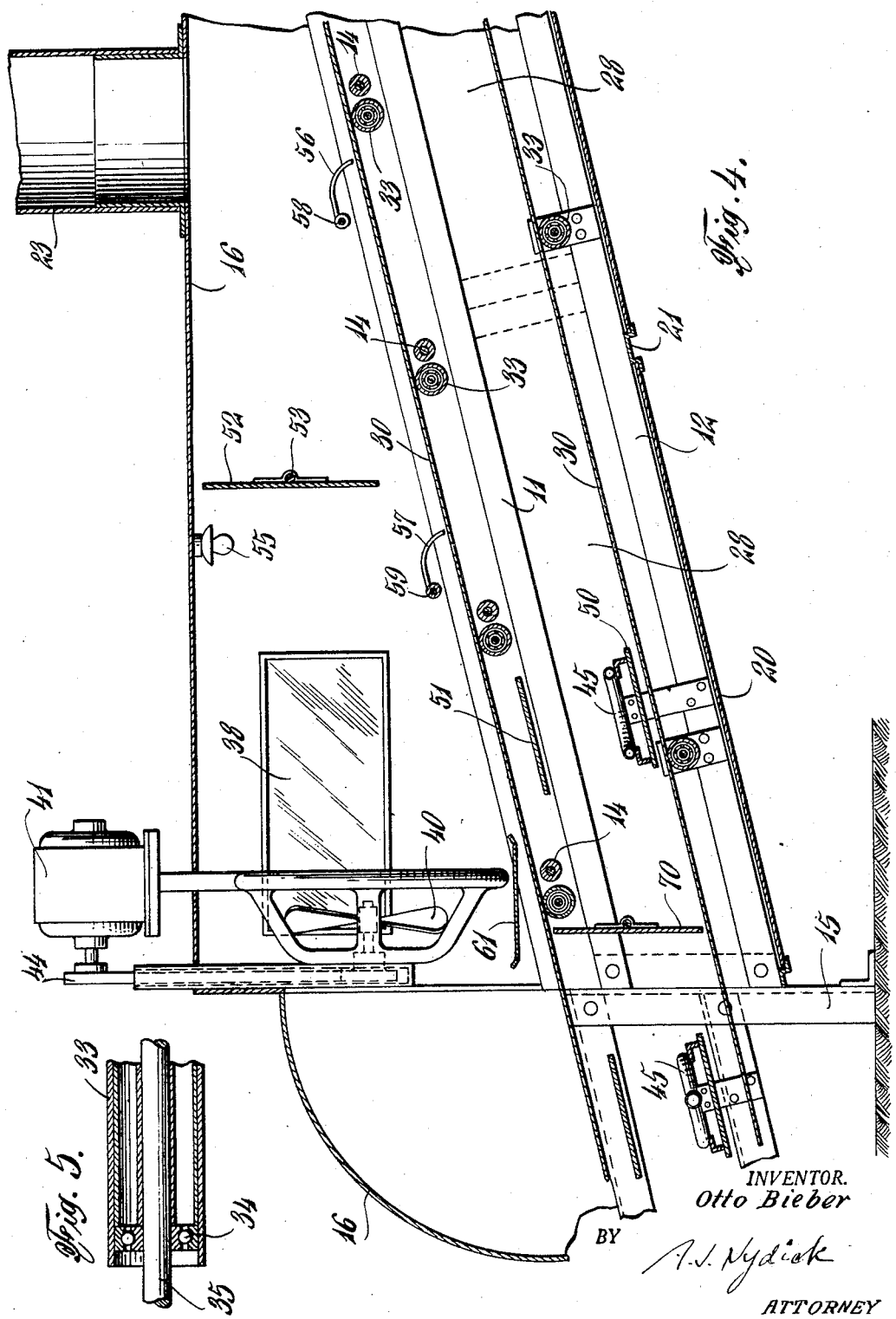
INVENTOR.
Otto Bieber
BY
A. J. Nydick
ATTORNEY Patented Oct. 12, 1948

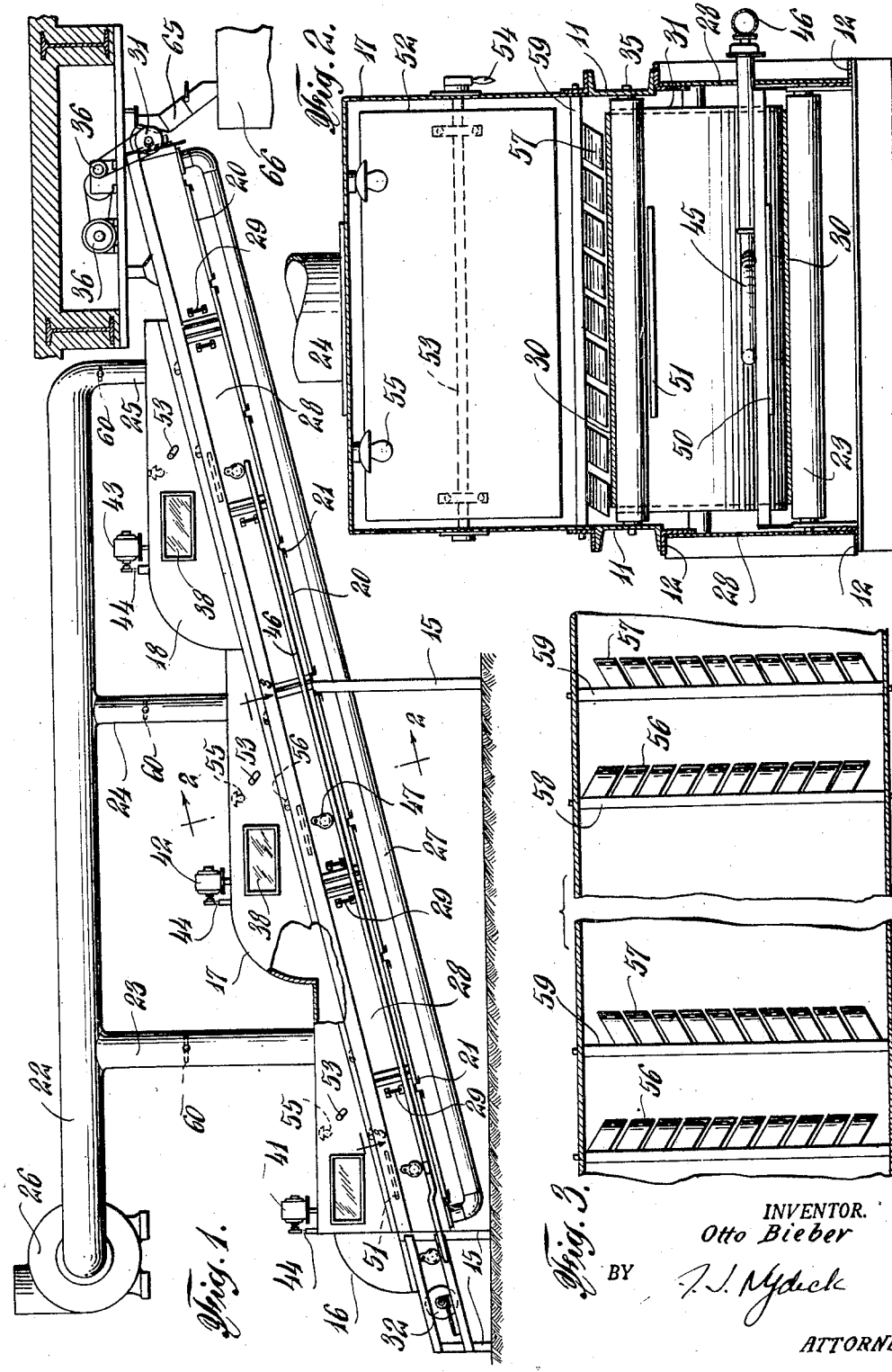

2,451,316

UNITED STATES PATENT OFFICE 2,451,316

APPARATUS FOR DESICCATION

Otto Bieber, New York, N. Y.

Application October 19, 1942, Serial 462,520

2 Claims. (Cl. 34—216)

This invention relates to apparatus for dehydration and in particular is directed to an improvement in the construction of tunnel-type dehydrators.

Many forms of apparatus used for dehydration, particularly of foods and feeds, produce materials which are either incompletely dehydrated or are impaired in quality because the operators have used excessive temperatures in trying to drive the dehydration to the limit. When the degree of dehydration falls short of the optimum consonant with quality of the product, the drying apparatus clearly is inefficient. When the dehydration has over-shot its mark and produced a material of impaired quality, there is likewise a severe economic loss.

It is, therefore, an object of this invention to provide an apparatus which will produce a dehydrated material, particularly a food or feed of high quality, containing a minimum of residual liquid.

Another object is to provide an apparatus which will operate effectively under severe loads and will require but little mechanical servicing.

Another object is to provide an apparatus which may be readily adjusted for the dehydration of a great variety of materials, such as, fruits, vegetables, meat, fish, grain mashes and the like.

Another object is to provide an apparatus which may be constructed or assembled from relatively inexpensive structural materials and with a minimum of engineering supervision.

Another object is to provide an apparatus having means for easily adjusting or controlling the degree of dehydration at various stages in the operation so as to yield a product of optimum value.

Another object is to provide an apparatus capable of handling small loads or large loads, thereby offering the dehydrator greater flexibility in the use of a single installation.

The essence of the invention which renders the foregoing objects possible of accomplishment resides in providing means for:

(a) Conveying the material to be dehydrated through a tunnel.

(b) Generating currents of dehydrating vapors at a plurality of positions in the tunnel.

(c) Controlling the temperatures at a plurality of positions in the tunnel.

(d) Controlling the velocity and volume of the exhausts at a plurality of positions in the tunnel.

(e) Exhausting a substantial portion of the vaporized moisture yielded by the material undergoing dehydration close to the area or vicinity of its release, at a plurality of positions in the tunnel, and immediately thereafter permitting the unexhausted portion to expand.

(f) Raking and turning the material being processed at a plurality of positions in the tunnel so as to effect greater uniformity in the rate of dehydration and more thorough elimination of moisture from the finished product.

Further objects and a fuller understanding of the invention will be gathered upon reading the following detailed description in connection with the accompanying drawings herein:

Figure 1 is a view, partly in outline and partly in section, diagrammatically illustrating the apparatus constructed in accordance with the present invention.

Figure 2 is an enlarged view in section taken on the line 2—2 of Figure 1 and looking in the direction of the arrows.

Figure 3 is an enlarged view in section taken on the line 3—3 of Figure 1 diagrammatically illustrating the raking devices.

Figure 4 is an enlarged view in section diagrammatically illustrating the lowermost section of the apparatus illustrated in Figure 1.

Figure 5 is a partial view in section showing the structural arrangement of one of the roller bearings supporting the conveyor belt.

Referring again to the drawings, the dehydration tunnel is built up around a frame consisting of the two parallel U beams 11 and pairs of angle irons 12 connected with each other to form the frame. The width of the frame may be varied depending upon the length of tie rods which connect the two U beams 11 to each other and similarly connect the angle irons 12 with each other. The frame is supported on a series of stanchions 15 of increasing height. This arrangement on the stanchions is used when the length of the apparatus is greater than the floor space, otherwise it may be construed parallel with the floor.

On this frame a tunnel roof is formed by means of a series of connected insulated sheet metal coverings 16, 17 and 18. This roof has the outline of a tilted sawtooth roof. The sections of the sheet metal may be bolted, spot-welded or otherwise assembled to form the tunnel roof by means customarily used in such structural art. In like manner they are also attached to the frame.

The floor of the tunnel is formed by means of a series of metal trays 20 resting on guides 21 which are fastened to the base of the frame, lower angle irons 12, in any convenient manner customarily followed in assembling such structural materials.

These trays also are used to adjust the air intake of the apparatus. By opening these sections of the tunnel floor to a desired position the operator can readily adjust the volume of intaken air to suit the needs of any particular operation at any desired point.

The walls of the tunnel are formed by means of a series of enclosing removable sheet metal sections 28 which are attached to the frame. They are provided with handles 29 and are attached to the frame by means of conventional fastening devices permitting easy removal whenever it becomes necessary to obtain access to the interior of the tunnel.

Each of the tunnel roof sections 16, 17 and 18 are connected to a master exhaust pipe or ducts 22 by means of individual flues or ducts 23, 24 and 25.

These flues decrease in diameter at their advancing positions in the apparatus. This decrease is an important feature. Since the moisture content of the exhaust decreases in the advancing positions of the apparatus, it is important to decrease the volume of the exhaust in order to conserve as much as possible of the hot dry air so that it may be reutilized. The exhaust system is actuated by an exhaust fan 26.

In order to utilize the dry hot air which arrives at the exit of the tunnel, a pipe 27 provides the means for returning this valuable source of energy to the entrance.

The entire tunnel is tightly constructed and insulated, wherever possible, in order to minimize heat radiation losses.

Within the tunnel there is a conveyor system comprising an endless belt 30 mounted on a driving pulley 31 and a take-up pulley 32. The belt rides over a series of rollers 33 which rotate on roller bearings 34 about an axle 35 which may be attached to the frame in any convenient fashion that will allow for their easy removal and reinstallation whenever it is necessary to do so. The conveyor system is actuated by a motor 36 connected to a speed reducer 37 which is connected with the driving pulley 31. It will be understood that the conveyor system may be driven by any other appropriate means which will produce the requisite velocity of the belt.

Each of the sides of the tunnel roof sections is provided with removable windows 38 which also function as manhole covers. In each of the foregoing sections there is a fan 40 actuated by its own variable speed motor 41, 42 and 43 through a driving belt 44. The fans may also be directly driven by the motor.

The apparatus is heated by means of a series of gas burners 45 connected to a gas supply line 46. Each burner is provided with a cock for separately regulating and controlling the temperature in the tunnel sections heated by the burners. To facilitate lighting of the burners the side walls are provided with self closing shutters 47.

The apparatus is provided with a series of baffles 50 located under the burners 45 in order to prevent undue heating of the belt conveyor. Another series of baffles 51 are positioned above the burners to prevent the direct flame from impinging on the belt and the materials carried thereby.

The belt conveyor is constructed of an open mesh screening material, which facilitates the dehydration process. The meshing is large enough to expose as much as possible of the material being processed to the action of the hot air.

Each of the dehydration sections formed by the tunnel roofing sections 16, 17 and 18 is provided with a movable baffle 52. These baffles mounted on rods 53 are actuated by means of external handles 54 which can be securely fastened so as to keep the baffle in any selected position. The baffles are mounted on rods in conventional fashion.

The tunnel is also provided with means for illumination such as incandescent bulbs 55. In place of these bulbs, the apparatus can be provided with ultra violet lamps, e. g., of the mercury vapor type. The ultra violet rays will be valuable for their sterilizing properties or activating characteristics, e. g., vitamin formation from precursors.

The apparatus is provided with a plurality of rakes having curved broad teeth angularly disposed in alternating directions. These teeth 56 and 57, mounted on rods 58 respectively, play an important role in the operation of the apparatus. As the material being dehydrated is conveyed on the belt through the tunnel, it is upturned and tossed from side to side by these raking means thereby keeping the mass constantly broken up and more thoroughly and evenly dehydrated. Since the belt is of open work structure the drying gases pass through the material undergoing dehydration.

The flues 23, 24 and 25 are each provided with butterfly dampers 60.

Each of the dehydration sections is provided with a baffle such as the one illustrated in Figure 4, numeral 61. These baffles increase in size at their advancing positions in the apparatus. The increase in size is important because of the need to lessen the effect of direct blast of the immediately superior fan on the material being dehydrated. As the dehydration progresses the material becomes lighter and would, therefore, be more readily blown off the belt if these baffles were not increased in size.

The discharge end of the tunnel is provided with an enclosure of insulated sheet metal, or equally effective material, which covers the driving pulley 31. This enclosure is connected with a hopper 65 to receive the dehydrated material as it is discharged from the belt conveyor. The hopper empties into a receptacle 66.

In order to carry out a dehydration with this apparatus, the conveyor belt 30 is put in motion; the burners 45 are lit; and all fans are started. Then the material to be processed is fed into the apparatus and evenly distributed across the breadth of the belt 30. The temperatures and moisture content of the air in the tunnel is observed or recorded by means of appropriate instrumentation. The readings are taken from conditions prevailing midway between the fans 40 and baffle 52. In order to maintain, at these positions, predetermined conditions of temperature and moisture, depending upon the character of the product being processed, the gas burners 45 are adjusted and the tunnel air intake regulated by positioning of the trays 20. Further adjustments are made by baffling the air blast from the fans 40 through movement of the baffles 52 and regulating the volume of the exhausts in flues 23, 24 and 25 through movement of dampers 60.

It will be observed that by means of this apparatus it is possible to exhaust a substantial quantity of the moisture released from the material being dehydrated almost immediately after the processing begins and that this exhausting is accomplished at several stages in the operation. In this way it is possible to achieve a much more rapid and effective dehydration than has heretofore ever been done in this art. Furthermore the provision of means for allowing the unexhausted vapors to expand as they enter the next position enables the operator to achieve surprising results in the dehydration at each such stage. These repeated expansions of the unexhausted vapors enables the operator effectively to carry out a dehydration at much lower temperatures than has heretofore been possible in this art, and nevertheless preserve the flavor and vitamin content of the materials.

It is also to be observed that in place of the gas burners it is possible to use any other devices or means which will develop currents of hot air to effect the dehydration.

It will also be observed that the movable baffle 70 permits the operator further to adjust the temperature in tunnel section 16 either at the initiation of the heating of the tunnel or at any time during the beginning or continuance of the dehydration operation.

Having thus described the invention, I claim:

1. In a drying apparatus the combination of: a tunnel having a substantially saw-toothed roof; an open work conveyor belt adjacent to the base line of the tunnel roof but spaced therefrom to form a plurality of throated sections thereby providing a series of connected narrow passageways to permit the passage of the material being dried and the gases above said material from one section to the next section; means at a plurality of positions in the tunnel below the conveyor belt for supplying hot drying gases to said sections; an exhaust duct situated adjacent the throat of one of the aforesaid sections; a fan within one of said throated sections between said roof and said conveyor belt for circulating said drying gases in contact with the material carried on the conveyor; and adjustable ports in the tunnel beneath the conveyor belt to permit the entrance of air at atmospheric temperature into the tunnel.

2. In a drying apparatus the combination of: a tunnel having a substantially saw-toothed roof; an open work conveyor belt adjacent to the base line of the tunnel roof but spaced therefrom to form a plurality of throated sections thereby providing a series of connected narrow passageways to permit the passage of the material being dried and the gases above said material from one section to the next section; means at a plurality of positions in the tunnel below the conveyor belt for supplying hot drying gases to said sections; an exhaust duct situated adjacent the throat of one of the aforesaid sections; a fan within one of said throated sections between said roof and said conveyor belt for circulating said drying gases in contact with the material carried on the conveyor; and an adjustable baffle within said last mentioned section for regulating the aforesaid circulation of the drying gases in contact with the material carried on the conveyor.

OTTO BIEBER.

REFERENCES CITED

The following references are of record in the file of this patent:

UNITED STATES PATENTS

| Number | Name | Date |
|---|---|---|
| 585,759 | Hysore | July 6, 1897 |
| 931,873 | Hough et al. | Aug. 24, 1909 |
| 1,034,112 | Hopkins | July 30, 1912 |
| 1,049,930 | Skinner | Jan. 7, 1913 |
| 1,266,983 | Parker | May 21, 1918 |
| 1,375,080 | Chappell | Apr. 19, 1921 |
| 1,385,365 | Dreyfoos | July 26, 1921 |
| 1,460,519 | Wadsworth | July 3, 1923 |
| 1,567,031 | Buensod | Dec. 29, 1925 |
| 1,572,326 | Straight | Feb. 9, 1926 |
| 1,670,991 | Schilde | May 22, 1928 |
| 1,750,839 | Furbush | Mar. 18, 1930 |
| 1,751,472 | Criqui | Mar. 25, 1930 |
| 1,788,099 | Fulmer | Jan. 6, 1931 |
| 1,966,405 | Galson et al. | July 10, 1934 |
| 2,149,813 | Lindstron | Mar. 7, 1939 |
| 2,270,111 | Daley | Jan. 13, 1942 |
| 2,272,383 | Poor, 2d, et al. | Feb. 10, 1942 |
| 2,280,704 | Hurxthal | Apr. 21, 1942 |
| 2,326,115 | Arthur | Aug. 10, 1943 |
| 2,359,199 | Burnett | Sept. 26, 1944 |

FOREIGN PATENTS

| Number | Country | Date |
|---|---|---|
| 12,389 | Great Britain | 1901 |
| 15,140 | Great Britain | 1899 |
| 61,385 | Sweden | Aug. 17, 1926 |
| 81,051 | Germany | May 9, 1895 |
| 224,708 | Germany (Marr) | July 29, 1910 |
| 236,936 | Great Britain | Oct. 22, 1925 |
| 336,009 | Great Britain | Oct. 9, 1930 |
| 535,718 | Germany | Oct. 14, 1931 |